United States Patent [19]

Berg

[11] 4,008,868
[45] Feb. 22, 1977

[54] AIRCRAFT STEERING AND BRAKING SYSTEM

[75] Inventor: Alan Berg, Horsham, Pa.

[73] Assignee: The United States of America as represented by the Secretary of the Navy, Washington, D.C.

[22] Filed: Dec. 18, 1975

[21] Appl. No.: 641,849

[52] U.S. Cl. .................................. 244/111; 244/50
[51] Int. Cl.² ........................................ B64C 25/48
[58] Field of Search ............ 188/345; 244/50, 111; 303/3, 6 R, 6 A, 15–17, 61–63, 68–69, 93, 100, 113, 117, 119

[56] References Cited

UNITED STATES PATENTS

| | | | |
|---|---|---|---|
| 2,906,376 | 9/1959 | Zeigler | 244/111 X |
| 3,507,542 | 4/1970 | Cannella | 303/3 X |
| 3,901,556 | 8/1975 | Prillinger et al. | 188/345 X |
| 3,920,278 | 11/1975 | Hirzel et al. | 244/111 X |
| 3,920,282 | 11/1975 | Devlieg | 244/111 X |
| 3,929,380 | 12/1975 | Leiber | 303/61 X |

*Primary Examiner*—Stephen G. Kunin
*Attorney, Agent, or Firm*—R. S. Sciascia; Henry Hansen

[57] ABSTRACT

A steering and braking system for aircraft while ground borne with remote and pilot-override control modes. In the remote mode, a single command controller operates both rudder and differential brakes of the main landing gear. The rudder is provided with a fast-response electro-hydraulic actuator for right, neutral and left positions while the brakes are provided with slow-response pulsating hydraulic actuators for right, left and unison braking. Above a predetermined air speed, the brake control is inactivated. In the pilot-override control mode, the rudder and differential brakes are independently controlled.

4 Claims, 3 Drawing Figures

AIRCRAFT STEERING AND BRAKING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to aircraft control devices, and more particularly to braking and steering control of aircraft while ground borne.

The QF4-B target drone is a full-scale, conventional F4-B Phantom II, high altitude supersonic aircraft modified for pilotless, remote control. It is especially used in gunnery practice and in evaluation of new weapon systems. It is capable of being flown by remote control through a complete operation from take-off to landing roll out. It can be flown as a basic F4-B, without restriction, by any qualified crew, or as a target by a remote control operator via radio link. A pilot riding with the target can control it in the same way as the remote operator or can disengage the target control circuits for basic F4-B flight.

The F-4B aircraft utilizes both nosewheel and differential brake steering systems. That is, the nosewheel steering system is selectively engaged by the pilot to respond to the rudder signal commanded by the pilot at the foot pedals. It is used primarily for taxiing the aircraft, and occasionally for take-off. The differential brake steering system applies braking forces to the right and left main landing wheels in response to brake signals applied to the right and left foot pedals, and is independent of rudder control. It is primarily used during take-off and landing. However, when the aircraft is modified for target drone use, both steering systems were inadequate. They were hypersensitive for remote control operation and caused skidding.

SUMMARY OF THE INVENTION

Accordingly, it is the general purpose of the present invention to provide a steering and braking system suitable for integrating in an existing aircraft steering and braking system which is selectively operable by a remote operator or by a pilot.

Another object of the invention is to provide a steering and braking system which is uniquely suitable for target drones in which coarse command signals are modified to avoid over-correction.

Still another object of the invention is to provide a steering and braking system for aircraft which is compatible with, and not in derogation of, an existing steering and braking system in the aircraft.

A still further object of the invention is to provide an aircraft steering and braking system which requires a minimal increase in parts and only minor modifications to the existing system.

Briefly, these and other objects are accomplished by selectively disengaging the nosewheel steering system and engaging the differential brake system to the rudder control and operating it in response to right and left rudder positions commanded by the pilot or a remote operator. A pulsating hydraulic system is utilized to reduce the response rate of the brakes relative to the rudder. In addition, the differential brake system maintains its integrity as an independently operable brake system by the pilot.

Other objects, advantages and novel features of the invention will become apparent from the following detailed description of the invention when considered in conjunction with the accompanying drawings wherein:

DESCRIPTION OF A PREFERRED EMBODIMENT

Figure 1:
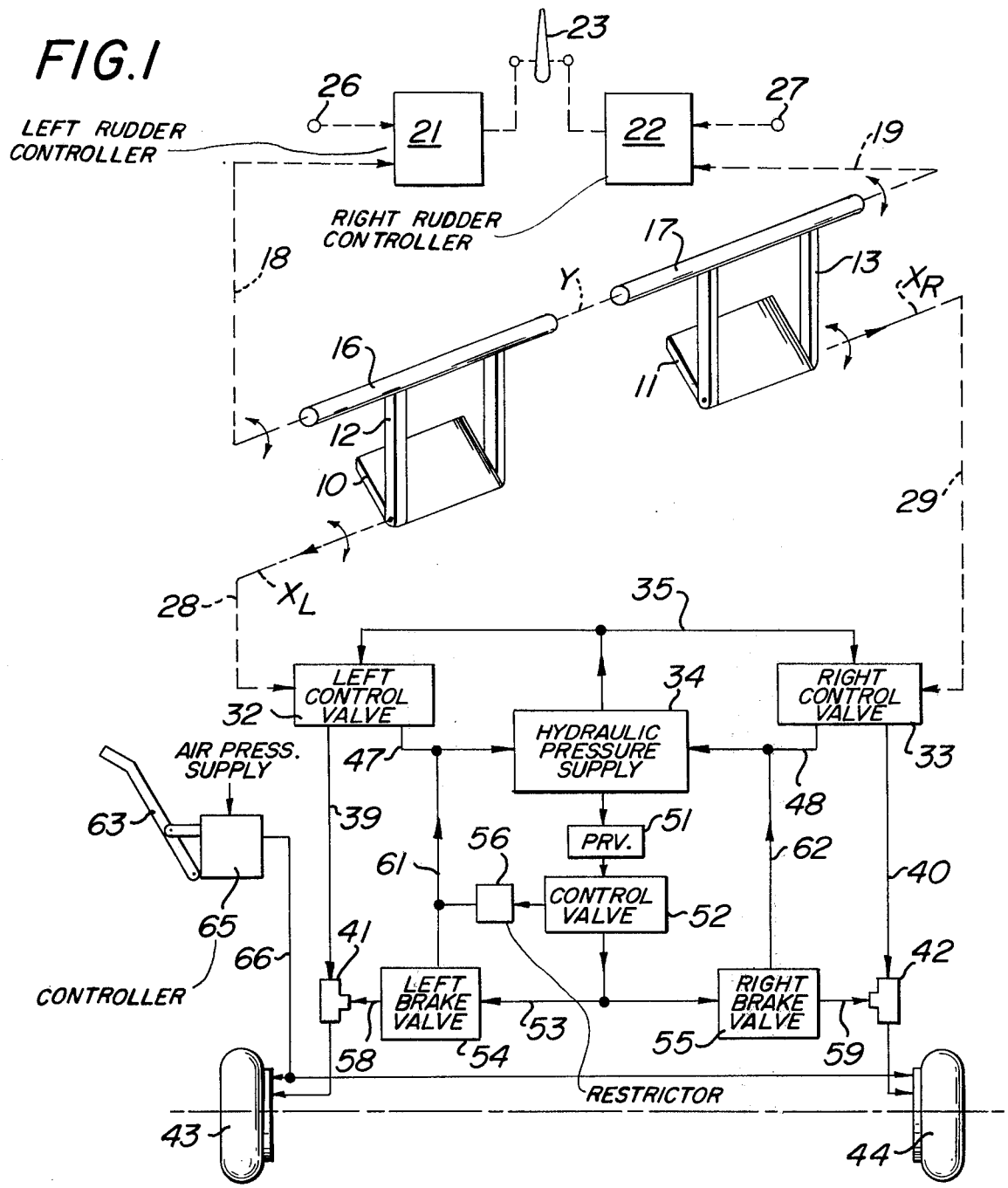
FIG. 1 is a diagrammatic representation of a steering and braking system for a target drone showing the mechanical and hydraulic interconnection of the foot pedals, control stick and hand brake with the rudder and landing wheels.

Referring now to FIG. 1, the system includes a pair of foot pedals 10 and 11 rotatably connected to rudder stirrups 12 and 13 about axes $X_L$ and $X_R$, respectively. The rudder stirrups are secured to shafts 16 and 17 for independently pivoting about axis Y. The angular positions of shafts 16 and 17 are transmitted through linkages 18 and 19 to rudder controllers 21 and 22 whose outputs operate a rudder 23. Electrical terminals 26 and 27 provide LEFT and RIGHT rudder command signals from the pilot or a remote operator via a radio link. Actuators 21 and 22 respond to either the remote command signal or the foot pedal position, however the latter will override when both occur simultaneously. The angular position of pedals 10 and 11 are transmitted by control linkages 28 and 29 to the movable elements of hydraulic valves 32 and 33. A 3,000 psi hydraulic pressure supply 34 connects through conduit 35 to the valve inlets. Control pressures responsive to the element position of valves 32 and 33 are transmitted through conduits 39 and 40 and shuttle valves 41 and 42 to the brakes of left and right wheels 43 and 44, respectively. Conduits 47 and 48 provide for hydraulic fluid return from valves 32 and 33 to supply 34.

Figure 2:
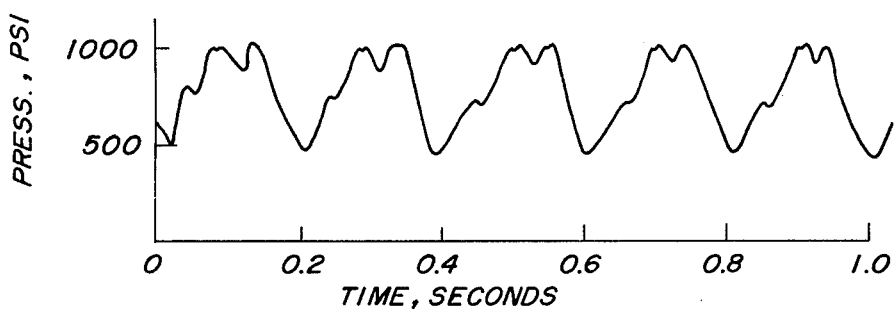
FIG. 2 is a graphical representation of typical pressures occurring in the pulsating hydraulic valve utilized in the system of FIG. 1.

Pressure supply 34 also connects through a pressure regulating valve 51 to a brake control valve 52 at a reduced pressure of 1,000 psi. A pressure level of 1,000 psi is high enough to optimize braking performance and at the same time low enough to avoid locked brakes and skidding. By means disclosed hereinbelow, valve 52 is selectively opened and closed manually or automatically at approximately five – six pulses per second resulting in pressure variations as shown in FIG. 2. Of course it is understood that the pressure and pulse rate may be varied to suit a particular design requirement.

From the pressure reducing valve, the 1,000 psi hydraulic fluid is directed to the brakes control valve 52. Through line 53 this valve directs hydraulic pressure to differential brake valves 54 and 55 whenever it is energized. De-energizing the control valve 52 causes a controlled pressure bleedoff through a restrictor 56 in the return line 61.

The brake valve outputs at conduits 58 and 59 are connected to the other inputs of shuttle valves 41 and 42, and conduits 61 and 62 provide a return for the hydraulic fluid to the supply 34.

Shuttle valves 41 and 42 are conventional valves for selectively passing fluid to their outlets from the inlet having the higher pressure. For example, when the pressure in conduit 39 exceeds the pressure in conduit 58, the control pressure at the brake of wheel 43 will be the same as within conduit 39, and when the pressure in conduit 58 is higher, that pressure will be transmitted to the brake of wheel 43. Thus, the pilot's normal braking system or the steering and brake control system of the present invention will operate the brakes. Both systems are completely independent of each other except that the pilot can override in an emergency, in which case the normal brake system with 3,000 psi available will immediately override the remote operator. This is due to the higher hydraulic pressure supply to control valves 32 and 33.

A standby hand brake 63 controls a separate and independent air pressure control system to the brakes of wheels 43 via controller 65 and 66 and operates the brakes in unison.

Figure 3:
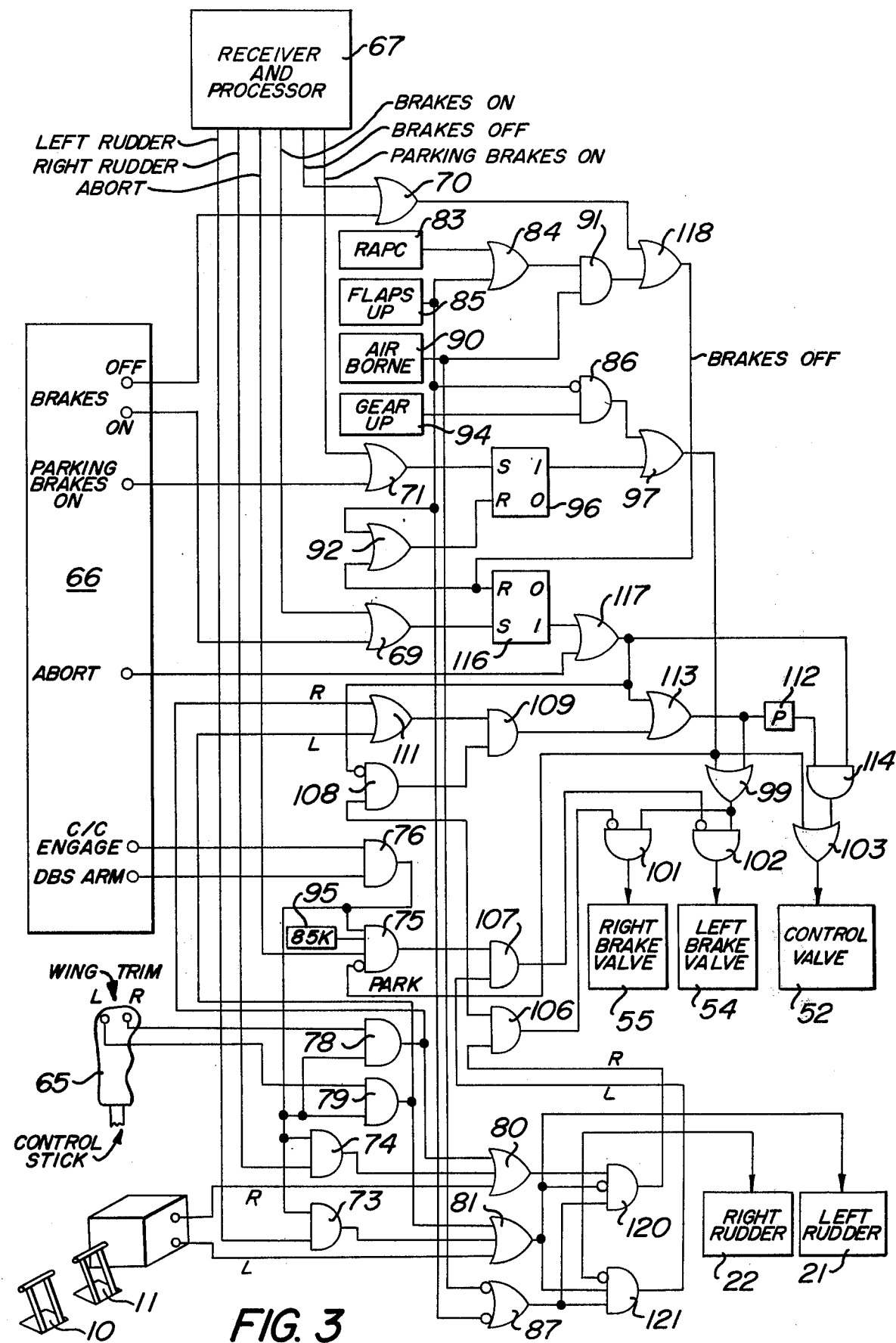
FIG. 3 is a functional block diagram of the system of FIG. 1 showing the electrical interconnection of its components.

Referring now to FIG. 3, signals for operating the system are received from within the cockpit or so-called "locally" obtained from the pilot operating pedals 10 and 11, the control stick 65' and various switches on control panel 66. By appropriate operation of switches, the system may also be remotely operated by radio signals transmitted to receiver and processor 67 from a ground observer. The receiver 67 includes six outputs representative of signals commanded by the remote operator. These are LEFT RUDDER, RIGHT RUDDER, ABORT, BRAKES ON, BRAKES OFF, and PARKING BRAKES ON. The LEFT and RIGHT RUDDER command signals are also producible in the aircraft by buttons on the control stick 65', while all brake command signals can also be generated at panel 66. The local and remote BRAKES ON, OFF, and PARKING signals are connected to OR gates 69, 70 and 71, respectively, while the remote LEFT and R(GHT RUDDER signals are connected to AND gates 73 and 74. Panel 66 also includes a control circuit (C/C) ENGAGE switch and differential brake steering (DBS) ARM switch which energize AND gate 76. The pilot's control stick 65' also includes RIGHT and LEFT rudder control switches which connect to AND gates 78 and 79. Foot pedals 10 and 11 produce right and left rudder and brake signals which are connected to OR gates 80 and 81.

Various limit switches are included in the system to insure various conditions have been met before command signals are effective. That is, RAPC (remote approach power compensator) switch 83 is connected to OR gate 84, and FLAPS UP indicating switch 85 to OR gate 84, AND gate 86 and OR gate 87. An AIRBORNE indicator switch 90 is connected to AND gate 91, OR gate 92 and OR gate 87, landing GEAR UP indicator switch 94 to AND gate 86, and 85-knot limit switch 95 to AND gate 75.

During normal AUTO BRAKES operation, both brake valves 54 and 55 are energized, allowing the pulsing hydraulic pressure to operate the brakes. When DIFFERENTIAL BRAKES STEERING (DBS) is required, the brake valve corresponding to the desired directional change will remain energized, allowing pulsed brake pressure to act on that brake, while the opposite valve is de-energized, dumping the hydraulic pressure in that brake to the return. The manner in which the respective signals and switches are interrelated to these modes is best understood by their operation.

AUTO BRAKES

AUTO BRAKES operation is used whenever it is desired to stop the aircraft in an emergency such as when the tail hook misses the arresting cable. With no other switches energized, a BRAKES ON command signal closes pulser lock-in flip-flop 116 which opens the right and left brake valves 54 and 55, and energizes the pulser 112. Pulser 112 causes the control valve 52 to cyclically open and close allowing 1,000 psi fluid pressure from regulating valve 51 to pass through the right and left brake valves 54 and 55 to the brakes of wheels 43 and 44.

A BRAKES OFF command releases the brakes by resetting flip-flop 116 thereby closing both brake valves 54 and 55. Simultaneously, control valve 52 is de-energized and closed shutting off pressure and dumping the residual pressure on the brakes to return conduits 61 and 62.

The PARKING BRAKES ON command operates through flip-flop 96 and produces a signal which bypasses the pulser 112 and applies voltage to control valve 52 and both brake valves 54 and 55 thereby allowing brake 1,000 psi fluid pressure to be applied continuously to the wheel brakes. A BRAKES OFF command will cause flip-flop 96 to reset and all three valves to de-energize thereby releasing the brakes.

During take-off, a PARKING BRAKES ON signal is generated as soon as the landing GEAR UP switch is closed. This applies full pressure to both wheels to stop them before they are retracted into the wheel wells. As soon as the flaps are up, the FLAPS UP switch 85 causes the flip-flop 96 to reset. Simultaneously, the AIRBORNE switch 90 produces a BRAKES OFF signal which is maintained during the flight until the flaps are lowered for landing. If the RAPC switch 83 is keyed for landing, the BRAKES OFF signal is maintained until the aircraft becomes groundborne. This feature is included to prevent the aircraft from landing with locked wheels.

DIFFERENTIAL BRAKE STEERING

The pilot-operated or remote-controlled differential brake system is used to provide steering during take-off and landing. The left and right brake valves 54 and 55 operate in unison to stop the aircraft, but are controlled independently to effect steering. With the C/C ENGAGE and DBS ARM switches on panel 66 energized, the AND gate 76 will pass power provided the airspeed is less than 85 knots, and the parking brake is not energized. This transfers the function of rudder control on the pilot's control stick 65' from lateral trim control to steering control. It should be noted that the remote automatic brake system will function without the remote steering system being armed, however steering will not function unless the brake system is armed.

Steering commands can now be initiated either by the pilot at the panel 66 or at stick 65', or by a remote operator via receiver and processor 67.

During take-off, with BRAKES OFF, keying LEFT RUDDER or actuating the switches on control stick 65' will energize left rudder actuator 23 provided the aircraft is groundborne or the flaps are not up. With the DBS ARM engaged, the following occurs: (1) the right brake valve 55 is prevented from opening, (2) the pulser 112 pulses the control valve 52, and (3) the left brake valve 54 opens. The brake system thus applies pulsing pressure to the brake of the left wheel 43 and none to the right wheel causing the aircraft to turn left. This condition is maintained until the command signal is released or the aircraft speed becomes greater than 85 knots, at which time switch 95 is de-energized. A RIGHT RUDDER command functions in a similar manner to pulse the right brake while preventing pressure from reaching the left brake turning the aircraft to the right.

With the brakes on, for example during landing roll out, a LEFT RUDDER command will de-energize the right brake valve 55 causing it to close. The pulsing pressure on the left brake and the lack of pressure on the right brake causes the aircraft to swing left. Similarly, a RIGHT RUDDER command causes a heading change to the right.

As long as the flaps are not up, the rudder surface responds each time LEFT or RIGHT RUDDER is keyed. Below 60 knots indicated airspeed, however the effect of the rudder on heading is negligible. Conversely, relatively small differences in the pressure at the wheel brakes is very effective in turning the aircraft even at low speeds. Consequently, aircraft steering is accomplished by the differential brake system below 85 knots and by rudder deflection above 85 knots.

The present system being a backup for a remotely-controlled aircraft in the event it misses the arresting cable during landing, has no backup or emergency system. However, a remote operator may use the PARKING BRAKES ON in the event of a pulser failure, and set up his own pulse rate by alternately keying PARKING BRAKES ON and BRAKES OFF.

Obviously many modifications and variations of the present invention are possible in light of the above teachings. It is therefore to be understood that within the scope of the appended claims the invention may be practiced otherwise than as specifically described.

What is claimed is:

1. A steering and braking system for an aircraft while groundborne comprising in combination:
   a pair of hydraulically operated brakes formed to be operatively connected to main landing wheels of the aircraft;
   a hydraulic fluid supply;
   a first pair of brake valves each having an inlet connected to receive high-pressure fluid from said supply, a first outlet for returning said fluid to said supply, and a second outlet for delivering a fluid control pressure in response to a command signal to said valve;
   a pair of foot pedals operatively connected to respective ones of said first pair of brake valves for providing said command signal as a function of braking force to be applied to the wheels;
   a control valve having an input connected to receive a reduced pressure fluid from said supply and for selectively passing said fluid to the outlet thereof;
   a second pair of brake valves each having an inlet connected to the outlet of said control valve, a first outlet for returning said fluid to said supply, and a second outlet for delivering a controlled fluid pressure;
   a pair of shuttle valves each having an outlet for delivering the fluid from either of two inlets having the fluid pressure, said first inlet connected to the second outlet of respective ones of said first and second pairs of brake valves; and
   circuit means for selectively opening said second pair of brake valves and including pulser means for cyclically opening and closing said control valve for pulsating the reduced pressure fluid, and switch means for selectively opening and closing said second pair of brake valves separately or in unison.

2. A steering and braking system according to claim 1 further comprising:
   first control means responsive to rudder command signals produced at said pair of foot pedals for actuating the aircraft rudder independently of said brake valves.

3. A steering and braking system according to claim 2 further comprising:
   second control means operatively connected between said switch means and said rudder control means for providing corresponding operation of said brake valves and the rudder.

4. A steering and braking system according to claim 3 wherein said circuit means further includes:
   interlock means connected to said switch means for closing said control and brake valves above a predetermined aircraft speed.

* * * * *